US006973306B2

(12) United States Patent
Kim

(10) Patent No.: US 6,973,306 B2
(45) Date of Patent: Dec. 6, 2005

(54) MULTIMEDIA SERVICE PROVIDING SYSTEM AND METHOD USING BLUETOOTH COMMUNICATIONS IN MOBILE COMMUNICATION SYSTEM

(75) Inventor: Sung-Hwae Kim, Kumi-shi (KR)

(73) Assignee: Samsung Electronics Co., Ltd., (KR)

( * ) Notice: Subject to any disclaimer, the term of this patent is extended or adjusted under 35 U.S.C. 154(b) by 439 days.

(21) Appl. No.: 10/194,107

(22) Filed: Jul. 12, 2002

(65) Prior Publication Data

US 2003/0022667 A1     Jan. 30, 2003

(30) Foreign Application Priority Data

Jul. 28, 2001  (KR) ............................ 2001-0045679

(51) Int. Cl.[7] .............................................. H04Q 7/20
(52) U.S. Cl. ............... 455/426.1; 455/41.2; 455/553.1; 709/219
(58) Field of Search ................... 455/426.1, 41.2, 455/553.1, 422.1, 424, 425, 550.1, 556.1, 455/556; 709/217, 219, 220

(56) References Cited

U.S. PATENT DOCUMENTS

| | | | |
|---|---|---|---|
| 6,603,977 B1 * | 8/2003 | Walsh et al. .................. 379/45 |
| 6,622,031 B1 * | 9/2003 | McCleary et al. ....... 455/575.7 |
| 6,665,549 B1 * | 12/2003 | Reed ......................... 455/573 |
| 6,678,516 B2 * | 1/2004 | Nordman et al. ........ 455/414.1 |
| 6,714,797 B1 * | 3/2004 | Rautila ..................... 455/552.1 |
| 6,731,939 B1 * | 5/2004 | Watanabe et al. .......... 455/450 |
| 6,748,195 B1 * | 6/2004 | Phillips ..................... 455/41.2 |
| 6,771,972 B2 * | 8/2004 | McDonnell et al. ..... 455/456.1 |
| 2002/0128037 A1 * | 9/2002 | Schmidt ...................... 455/553 |
| 2002/0188736 A1 * | 12/2002 | Jarvensivu .................. 709/229 |
| 2003/0181205 A1 * | 9/2003 | Yiu et al. ................. 455/426.1 |
| 2003/0208522 A1 * | 11/2003 | McDonnell et al. ........ 709/201 |
| 2004/0203382 A1 * | 10/2004 | Park ........................... 455/41.2 |
| 2005/0119005 A1 * | 6/2005 | Segal et al. ................. 455/445 |
| 2005/0130646 A1 * | 6/2005 | Frank et al. ............. 455/426.1 |

* cited by examiner

*Primary Examiner*—CongVan Tran
(74) *Attorney, Agent, or Firm*—Dilworth & Barrese LLP

(57) ABSTRACT

A system and method of providing multimedia services regardless of data transfer rate degradation that occurs during implementation of multimedia services through a mobile communication network; including a main server and Bluetooth™ access points connected via the Internet, and a portable terminal including a Bluetooth™ module with wireless access to the Internet via the mobile communication network. The main server transfers multimedia data to the portable terminal via the mobile communication network or via a Bluetooth™ access point, in response to a service request, and the portable terminal typically receives multimedia data via the mobile communication network, but will receive multimedia data via the Bluetooth™ access point when the transfer rate reaches or falls below a reference value, thereby continuously receiving the multimedia data via the Bluetooth™ access point in place of the mobile communication network.

16 Claims, 8 Drawing Sheets

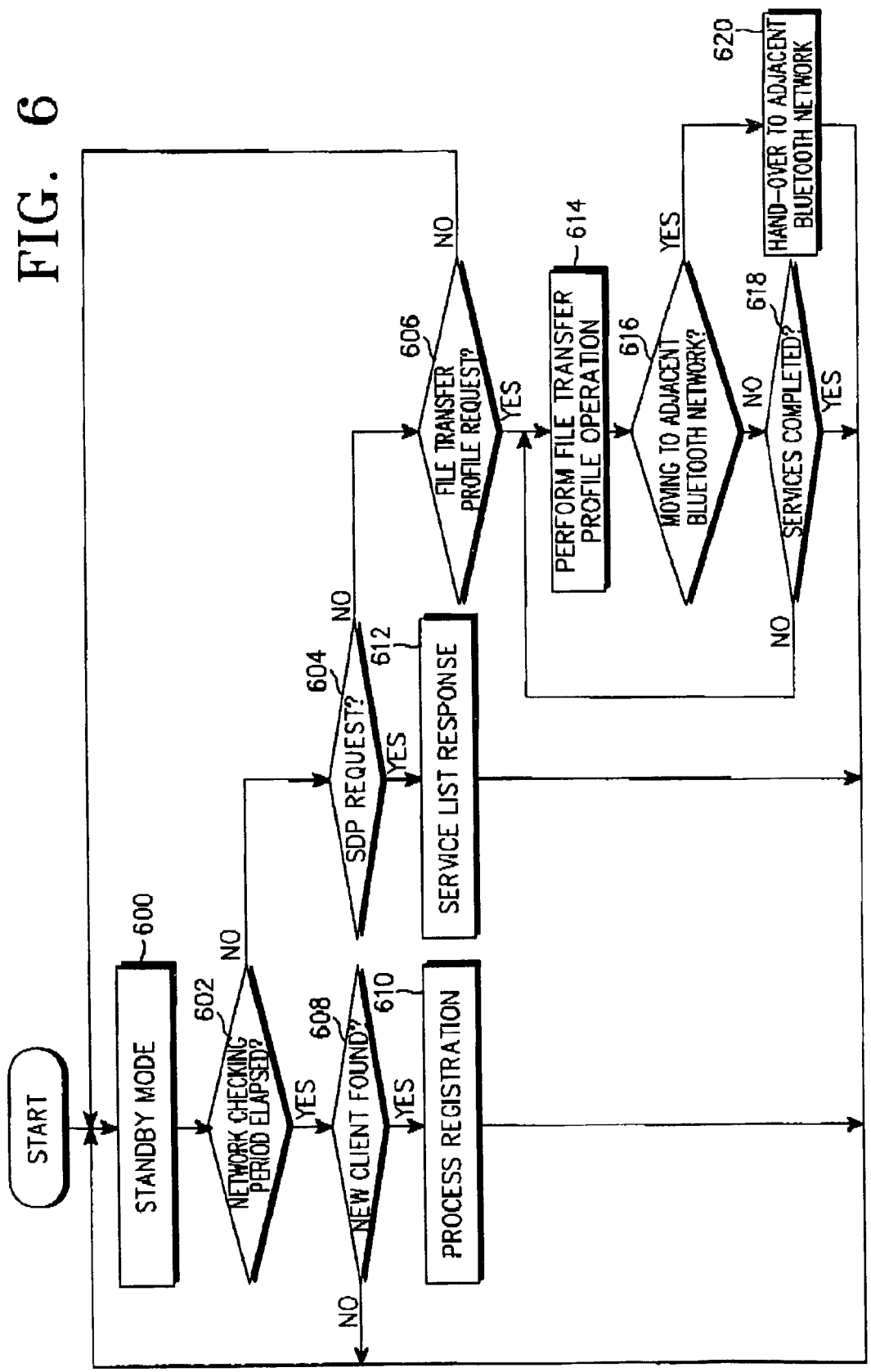

MULTIMEDIA SERVICE PROVIDING SYSTEM AND METHOD USING BLUETOOTH COMMUNICATIONS IN MOBILE COMMUNICATION SYSTEM

This application claims priority to an application entitled "Multimedia Service Providing System and Method Using Bluetooth Communications in Mobile Communication System", filed in the Korean Industrial Property Office on Jul. 28, 2001 and assigned Serial No. 2001-45679, the contents of which are hereby incorporated by reference.

BACKGROUND OF THE INVENTION

1. Field of the Invention

The present invention relates to a mobile communication system, and particularly to a system and method for providing multimedia services to the user of a portable terminal.

2. Description of the Related Art

Recently, demand for multimedia services has been increased. To meet such demand, multimedia services, such as VOD (Video On Demand) services and AOD (Audio On Demand) services, have been available in portable phones such as PDAs (Personal Digital Assistants), smart phones, and mobile communication terminals.

Portable terminals can receive multimedia data in accordance with a method in which data is directly transferred to a portable terminal through a PLMN (Public Land Mobile Network), or a method in which data is received by a personal computer via a wired communication network, and then transferred from the personal computer to a portable terminal, using a data transfer cable. However, where the data transfer cable is used, it is difficult to receive data while the user is moving. Furthermore, it is necessary to use additional backbone type devices such as a computer, a LAN (Local Area Network) and a MODEM (Modulator-Demodulator). For this reason, it is desirable to implement multimedia services using wireless communications.

Meanwhile, separate backbones are provided for wired communications so that they are used in emergency situations or to cope with an increase in traffic. For mobile communications, however, there is no measure to compensate for a degraded wireless radio environment, and a degradation in data transfer rate is frequently caused by an increase in traffic occurring in a mobile communication network. Using wireless communications having a limited frequency band and a lower data transfer rate than that of wired communications, it is difficult to meet an increase in the number of users, and an increase in the size of multimedia data. In particular, in the case of GPRS (General Packet Radio System) services or IMT-2000 (International Mobile Telecommunications-2000) services in which multimedia services are important, use of those services is concentrated at particular areas such as public areas. When multimedia services are used at an increased rate in such areas, the transfer rate of multimedia data lowered due to an increase in the number of users and an increase in the size of transferred data is further lowered. For this reason, serious problems occur.

SUMMARY OF THE INVENTION

Therefore, an object of the invention is to provide a system for and method of providing multimedia services, which can provide a superior multimedia service environment even when a degradation in data transfer rate occurs during an implementation of multimedia services through a mobile communication network.

In order to accomplish this object, the present invention provides a system for providing multimedia services to a portable terminal via a mobile communication network, comprising a main server for providing multimedia services via the Internet; Bluetooth™ access points connected to the main server via the Internet, with each Bluetooth™ access point including a Bluetooth™ module having a file transfer profile, and operating in a Bluetooth™ network having a defined service area; and a portable terminal including its own Bluetooth™ module having the file transfer profile, the portable terminal having wireless access to the Internet via the mobile communication network. The main server transfers multimedia data to the portable terminal via the mobile communication network or via one of the Bluetooth™ access points, in response to a service request received from the mobile communication network or the Bluetooth™ access point. The Bluetooth™ access point can send the service request to the main server in response to a service request received from the portable terminal, receive the multimedia data from the main server, and transfer the received multimedia data to the portable terminal. The portable terminal can also send the service request to the main server in accordance with the wireless access to the Internet via the mobile communication network.

Multimedia data is transferred from the main server in response to the service request sent to the main server. When a transfer rate of the multimedia data transferred via the mobile communication network is reduced to a reference value or less during the transfer of the multimedia data, the portable terminal sends a service request to the Bluetooth™ access point, thereby continuously receiving the multimedia data via the Bluetooth™ access point in place of the mobile communication network.

Alternatively, the Bluetooth™ access point may store, in a storage unit, the multimedia data received from the main server in response to the service request sent to the main server while transferring the received multimedia data to the portable terminal, so as to send, in response to a subsequent request for the multimedia data from the portable terminal, the stored multimedia data to the portable terminal without receiving again the multimedia data from the main server.

The Bluetooth™ network associated with the Bluetooth™ access point and the portable terminal perform a hand-over to an adjacent Bluetooth™ network when the portable terminal moves to a service area of the adjacent Bluetooth™ network during the transfer of the multimedia data between the portable terminal and the Bluetooth™ access point, whereby the multimedia data is continuously transferred.

BRIEF DESCRIPTION OF THE DRAWINGS

The above objects and advantages of the present invention will become more apparent by describing in detail preferred embodiments thereof with reference to the attached drawings in which:

FIG. 6 is a flow chart illustrating sequential processing operations performed by the Bluetooth™ access point in accordance with an embodiment of the present invention.

DETAILED DESCRIPTION OF THE PREFERRED EMBODIMENT

The following detailed description of a preferred embodiment of the invention is made in reference to the accompanying drawings. In the following explanation related functions or constructions that are known in the art are omitted for the sake of clearness in understanding the concept of the invention, as such would obscure the invention with unnecessary detail.

Figure 1:
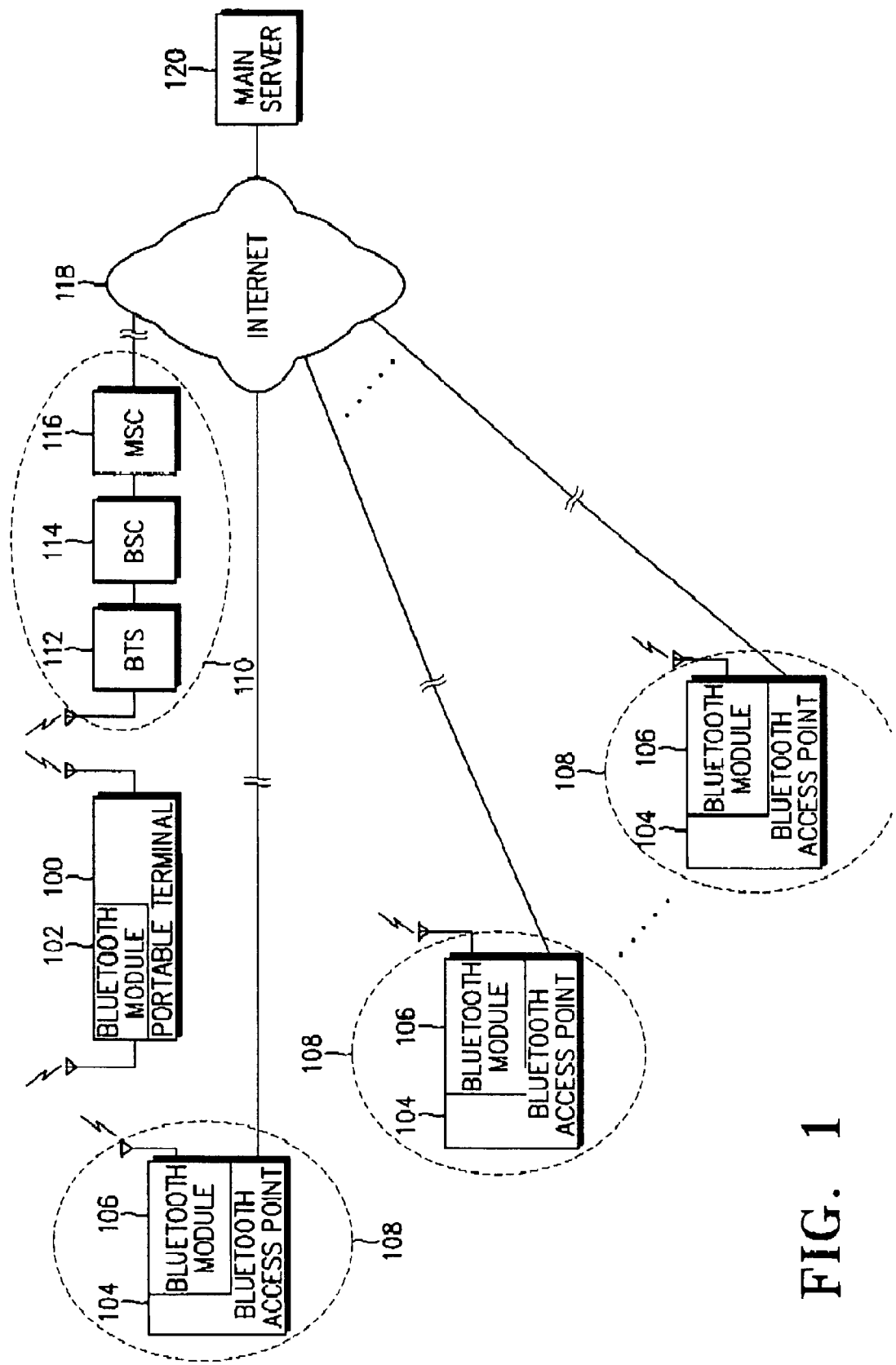
FIG. 1 is a diagram illustrating the network configuration of a multimedia service providing system according to an embodiment of the present invention.

FIG. 1 is a diagram illustrating the network configuration of a multimedia service providing system according to an embodiment of the present invention. Referring to FIG. 1, a portable terminal 100 is connected to the Internet 118 via a mobile communication network 110. Along with the mobile communication network 110, a plurality of Bluetooth™ access points (an example of which is depicted as item 104) are connected to a main server 120 via the Internet 118. Although not shown in FIG. 1, the connection of the Bluetooth™ access points (104), mobile communication network 110, and main server 120 to the Internet 118 is achieved using an ISDN (Integrated Services Digital Network), PSDN (Packed Switched Data Network), or gateway, as well known to one of ordinary skill in the art. In the mobile communication network 110, a BTS (Base Transceiver Station) 112 is connected to a BSC (Base Station Controller) 114, which is connected to an MSC (Mobile Switching Center) 116. Typically, a plurality of BTSs 112 are connected to the BSC 114 in the mobile communication network 110. In the illustrated case, only one BTS 112 is shown for the simplicity of illustration.

Figure 2:
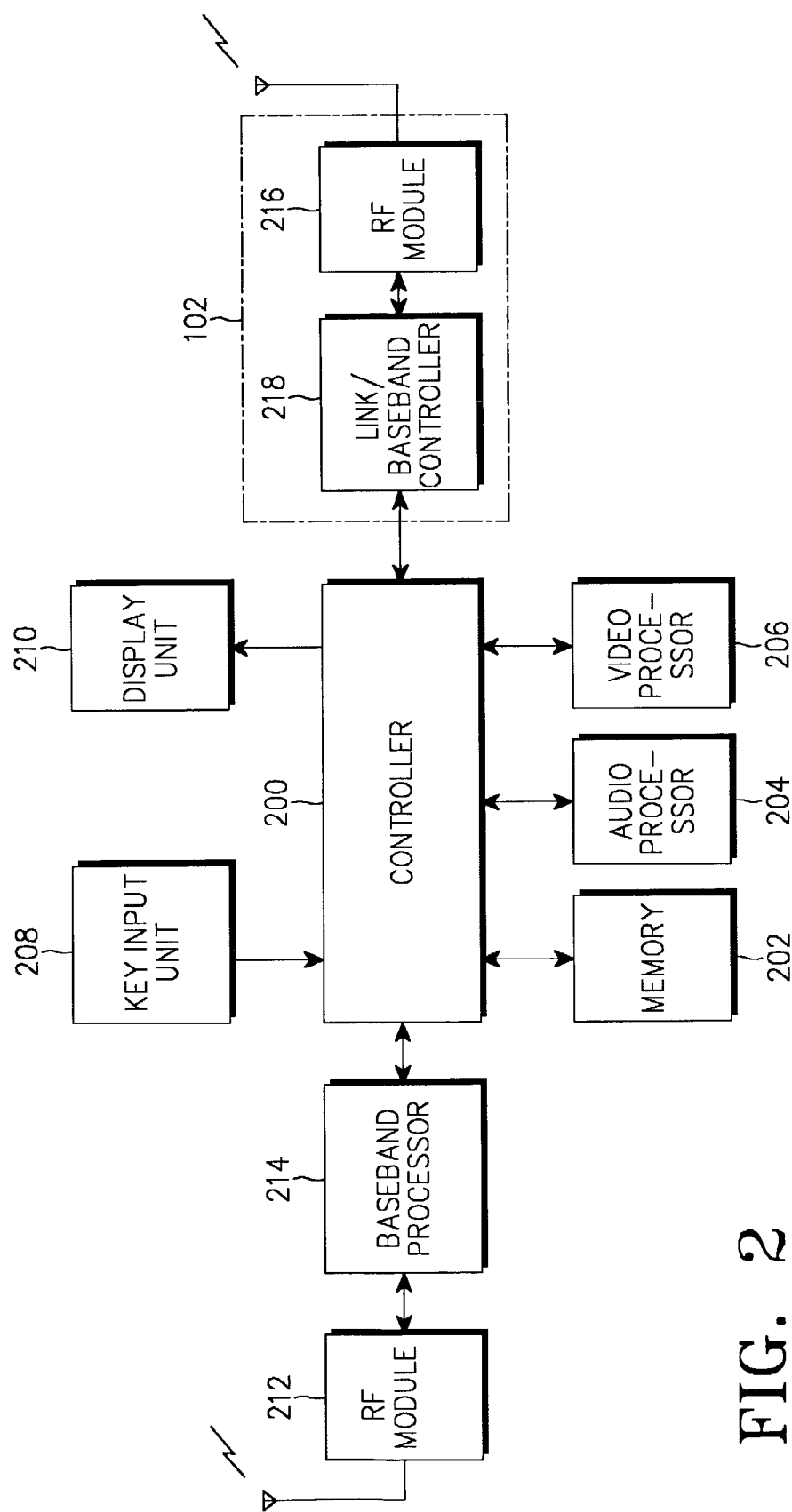
FIG. 2 is a block diagram of a portable terminal in accordance with an embodiment of the present invention.

The portable terminal 100 may be a PDA, smart phone, or mobile communication terminal, which can implement multimedia services while having access to the Internet 118 in accordance with its wireless Internet access through the mobile communication network. As shown in FIG. 2, the portable terminal 100 includes a Bluetooth™ module 102.

FIG. 2 is a block diagram of a mobile communication terminal used for the portable terminal 100 in accordance with an embodiment of the present invention. The configuration of the portable terminal 100 will be described with reference to FIG. 2. Referring to FIG. 2, a controller 200 processes, in a controlled fashion, diverse functions including implementation of multimedia services. A memory 202 includes a ROM (Read Only Memory) for storing microcodes of a program for processing and controlling operations of the controller 200, along with diverse reference data, a RAM (Random Access Memory) serving as a working memory of the controller 200, and a flash RAM for providing a memory area adapted to store diverse storage data, able to be updated, along with multimedia data. An audio processor 204, which is connected to the controller 200, processes outputting of telephone speech, recorded voice, and an incoming call alerting sound through a microphone and a speaker. A video processor 206 performs a processing for outputting, typically in the form of moving pictures, video data received in accordance with multimedia services. A key input unit 208 includes numeral keys corresponding to numerals of 0 to 9, and a plurality of function keys which can include a "MENU" key, a "CALL" key, an "ERASE" key, an "END" key, "*" key, "#" key, a "VOLUME" key, etc. The key input unit 208 provides to the controller 200 key input data corresponding to a key pressed by the user. A display unit 210 displays diverse pictures on a screen under the control of the controller 200. An RF (Radio Frequency) module 212 transmits and receives RF signals to and from the BTS 112 of the mobile communication network 110. That is, the RF module 212 modulates a signal, to be transmitted, received from the controller 200 via a baseband processor 214, and transmits the modulated signal, that is, an RF signal, over an antenna. The RF module 212 also demodulates an RF signal received via the antenna, and applies the received RF signal to the controller 200 via the baseband processor 214. The baseband processor 214 processes baseband signals transmitted and received between the RF module 212 and the controller 200. To the controller 200, a Bluetooth™ module 102 is connected which includes an RF module 216, and a link/baseband controller 218. The RF module 216 transmits and receives RF signals to and from a Bluetooth™ module 106. The link/baseband controller 218 is connected between the controller 200 and the RF module 216. The link/baseband controller 218 performs a link management and baseband processing according to a file transfer profile.

Figure 3:
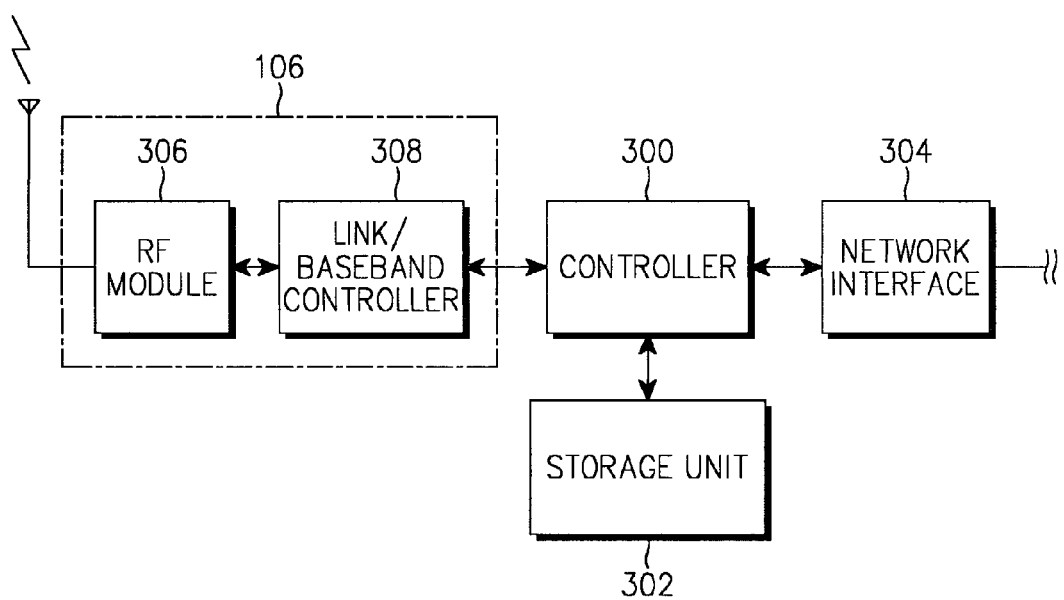
FIG. 3 is a block diagram of a Bluetooth™ access point in accordance with an embodiment of the present invention.

The Bluetooth™ access points (104) are connected to the main server 120 via the Internet 118. Each Bluetooth™ access point 104 operates as the master of the Bluetooth™ network (depicted as item 108 in FIG. 1) associated with a selected one of defined areas. As shown in FIG. 3, each Bluetooth™ access point 104 includes one Bluetooth™ module 106. Each Bluetooth™ network 108 corresponds to a Bluetooth™ piconet. The Bluetooth™ networks 108 are connected together, thereby forming a scatternet. One or ordinary skill in the art will recognize that the Bluetooth™ access point 104 can simultaneously act as both a master in one piconet and as a slave in another piconet, when the two piconets form a scatternet.

FIG. 3 is a block diagram of the Bluetooth™ access point 104 according to an embodiment of the present invention. The configuration of the Bluetooth™ access point 104 will be described with reference to FIG. 3. Referring to FIG. 3, a controller 300 receives multimedia data from the main server 120 via the Internet 118, to which the controller 300 is connected via a network interface 304, and sends the received multimedia data to the portable terminal 100 via the associated Bluetooth™ module 106. A storage unit 302 is connected to the controller 300 in order to store the multimedia data sent from the main server 120 to the controller 300. The network interface 304 provides an interface to the Internet 118. Similar to the Bluetooth™ module 102 of the portable terminal 100, the Bluetooth™ module 106 includes an RF module 306, and a link/baseband controller 308. The RF module 306 transmits and receives RF signals to and from the Bluetooth™ module 102 of the portable terminal 100. The link/baseband controller 308 is connected between the controller 300 and the RF module 306. The link/baseband controller 308 performs a link management and baseband processing according to the file transfer profile.

Figure 4:
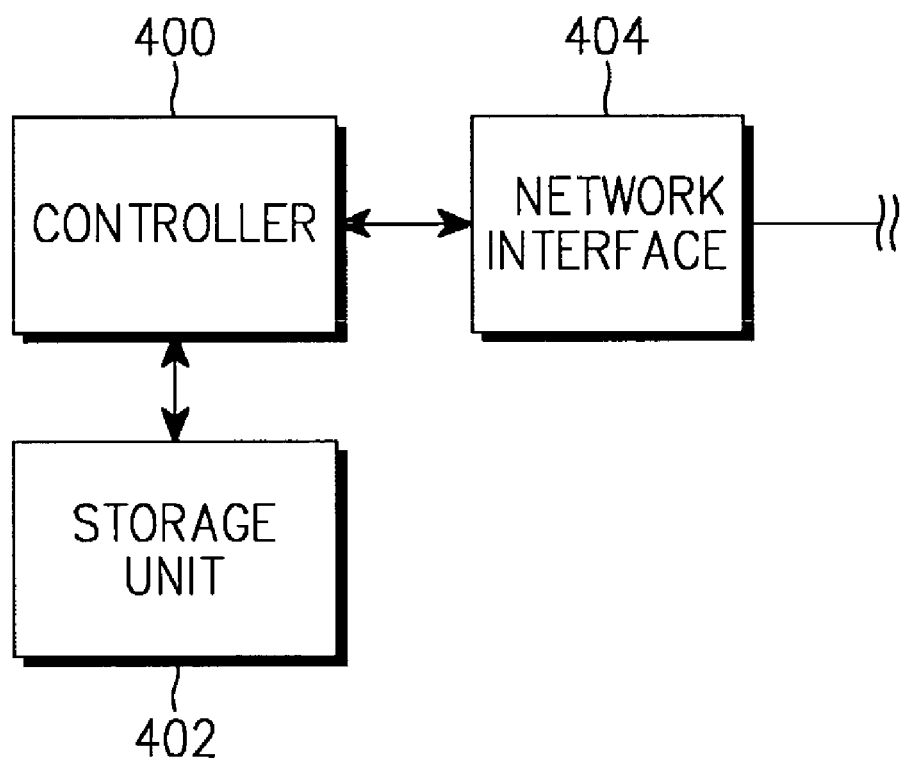
FIG. 4 is a block diagram of a main server in accordance with an embodiment of the present invention.

The main server 120 includes a multimedia service server for providing, via the Internet 118, multimedia services such as VOD services or AOD services. FIG. 4 is a block diagram illustrating the configuration of this server. The configuration of the main server 120 will be described with reference to FIG. 4. Referring to FIG. 4, a controller 400 is illustrated. When the controller 400 receives a request for multimedia services from the mobile communication network 110 or from Bluetooth™ access point 104, via the Internet 118 to which the controller 400 is connected via a network interface 404, it sends multimedia data to the portable terminal 100 via the mobile communication network 110 or Bluetooth™ access point 104 in response to the request. The multimedia data to be transmitted in accordance with multimedia services is typically buffered using a storage unit 402. The network interface 404 provides an interface to the Internet 118.

In a manner similar to general cases, the portable terminal 100 requests multimedia services in accordance with a manipulation by the user after wirelessly accessing the Internet via the mobile communication network 110, and receives multimedia data from the main server 120. When a degradation in wireless radio mobile communication network service environment or when an increase in the rate of use of multimedia services occurs at a particular area during the multimedia services are implemented via the mobile communication network 110, a degradation in data transfer rate occurs. When the data transfer rate is reduced to a reference value or less during reception of multimedia data, the portable terminal 100 requests the associated Bluetooth™ access point 104 to provide multimedia services, so as to continuously receive multimedia data via the Bluetooth™ access point 104 in place of the mobile communication network 110. Thus, the portable terminal 100 can receive multimedia data in a superior multimedia service environment provided through the Bluetooth™ access point 104 when the data transfer rate is reduced (i.e., lowered) during the reception of multimedia data. In this regard, it is preferable that Bluetooth™ access points (104) be installed or otherwise available via Bluetooth™ network 108 at public places, which is where use of multimedia services is often concentrated.

In order to implement the above mentioned function, the Bluetooth™ module 102 of the portable terminal 100 and the Bluetooth™ module 106 of each Bluetooth™ access point 104 have a file transfer profile. The file transfer profile, which is one of various profiles of Bluetooth™, is adapted to enable transfer of files between a server and a client. In accordance with the present invention, the Bluetooth™ access point 104 operates as a server of the file transfer profile, whereas the portable terminal 100 operates as a client of the file transfer file. That is, the Bluetooth™ access point 104 sends multimedia data received from the main server 120 to the portable terminal 100, using the file transfer profile. Where the Bluetooth™ access point 104 receives a request for multimedia services from the portable terminal 100, it transfers to portable terminal 100 the desired multimedia data stored in the data storage unit 302. If the multimedia data is not stored in the data storage unit 302, the Bluetooth™ access point 104 then requests that the main server 120 provide the requested multimedia services, so that it receives desired multimedia data from the main server 120, and sends the received multimedia data to the portable terminal 100.

Figure 5A:
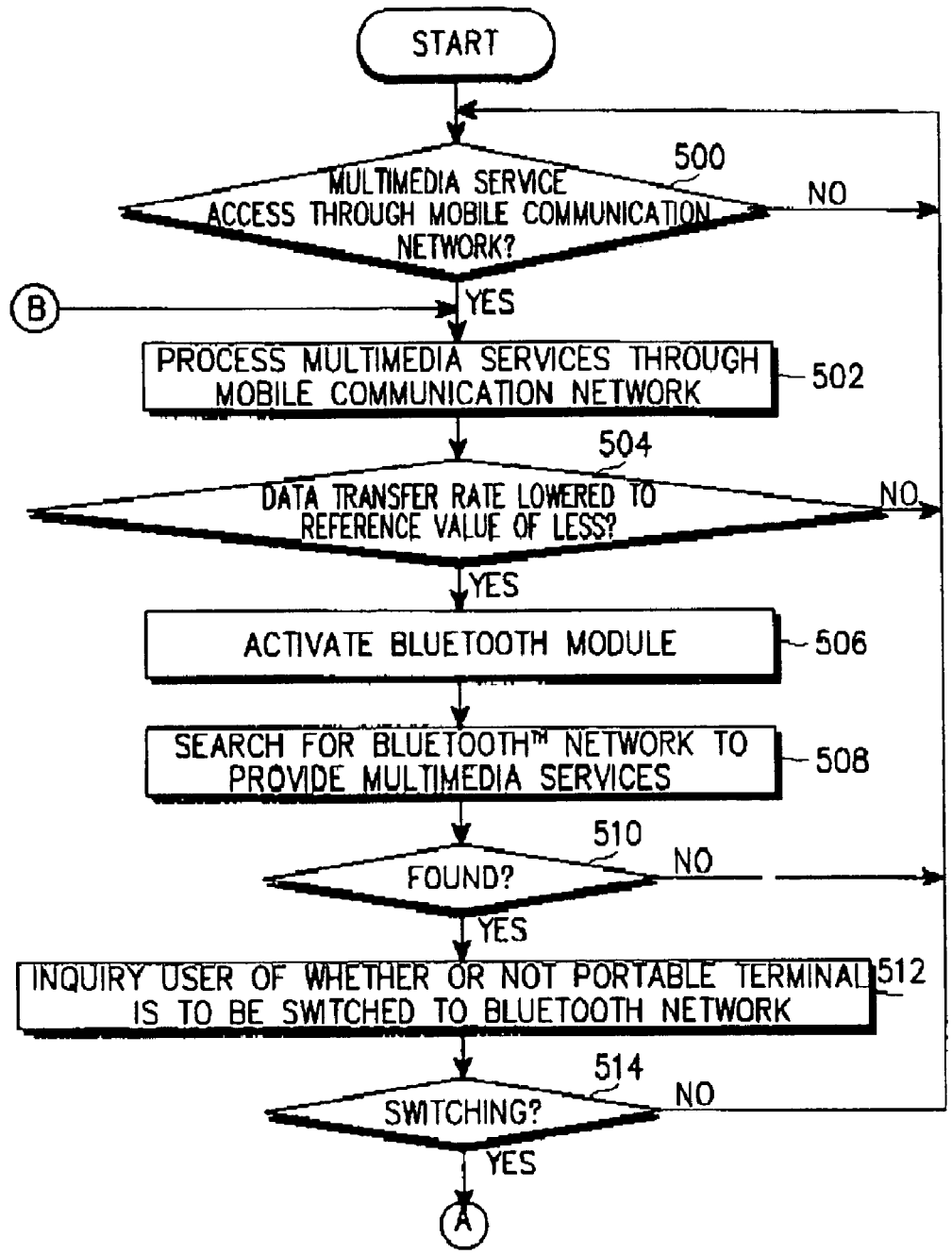
FIGS. 5A and 5B make up a flow chart illustrating sequential processing operations performed by the portable terminal in accordance with an embodiment of the present invention.
Figure 5B:
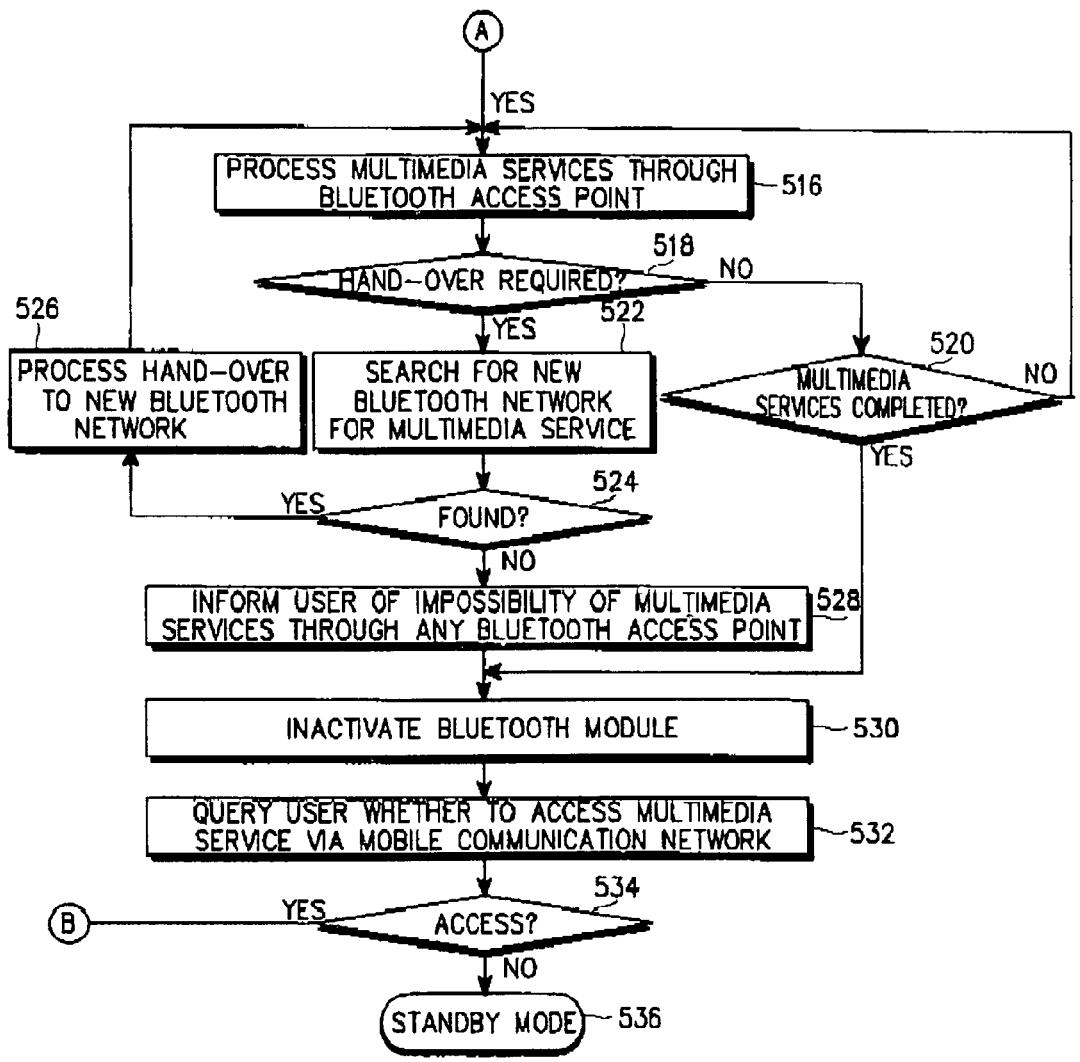

Now, sequential processing operations performed by the controller 200 of the portable terminal 100 will be described with reference to FIGS. 5A and 5B showing steps 500 to 536. At step 500, the controller 200 determines whether or not the portable terminal 100 is connected to the main server 120 for multimedia services in accordance with its wireless access to the Internet 118 through the mobile communication network 110 made in response to a manipulation by the user. When it is determined at step 500 that the portable terminal 100 is connected to the main server 120, the procedure proceeds to step 502. At step 502, the controller 200 requests the main server 120 to provide desired multimedia services, and performs reception of the multimedia services, that is, receives multimedia data transferred from the main server 120 via the mobile communication network 110.

During the reception of multimedia data from the main server 120, the controller 200 of the portable terminal 100 checks (i.e. determines) at step 504 whether or not the data transfer rate is reduced to a reference value or less. The reference value is previously set to a data transfer rate at which it becomes difficult to implement multimedia services, depending on the application of multimedia services. When the data transfer rate is higher than the reference value, the processing of multimedia services performed through the mobile communication network 110, and step 504 continues to provide multimedia service to the portable terminal 100 via the mobile communication network 110, returning to step 500. However, when the data transfer rate is determined to be at or below the reference value, the controller 200 activates the Bluetooth™ module 102 of the portable terminal 100 at step 506. In the latter case, steps 508 and 510 are performed. That is, the activated Bluetooth™ module 102 registers the portable terminal 100 to Bluetooth™ networks (108) located around the portable terminal, and searches for a Bluetooth™ network 108 capable of providing multimedia services, using an SDP (Service Discovery Protocol) according to the file transfer profile.

Where there is no Bluetooth™ network capable of providing multimedia services, the processing of multimedia services performed through the mobile communication network 110 at step 502 is continued. On the other hand, when the controller 200 receives a service list response from one or more Bluetooth™ access points (104) in accordance with execution of step 612 of FIG. 6, it determines, based on the received service list response, that there is a Bluetooth™ network 108 capable of providing desired multimedia services. Once the controller 200 determines the Bluetooth™ network 108 capable of providing desired multimedia services, it executes steps 512 and 514. At steps 512 and 514, the controller 200 is switched from the mobile communication network 110 to the Bluetooth™ network 108, and then inquires of the user whether or not transfer of multimedia data is to be continued, by displaying an associated message on the display unit 210. When the user does not want to switch to the Bluetooth™ network 108, the controller 200 will continuously perform the processing of multimedia services through the mobile communication network 110, returning to step 502. On the other hand, when the user wants to switch the portable terminal 100 to the Bluetooth™ network 108, the controller 200 stops the reception of multimedia data via the mobile communication network 110 at step 516, and requests the Bluetooth™ access point 104 associated with the Bluetooth™ network 108 to provide multimedia services by requesting the associated Bluetooth™ access point 104 to provide a file transfer profile. Thus, the controller 200 continuously performs the processing of multimedia services by receiving multimedia data from the Bluetooth™ access point 104. In this case, the controller 200 of the portable terminal 100 informs the Bluetooth™ access point 104 of information about the already received multimedia data, so as to avoid receipt of redundant multimedia data. An alternative embodiment replaces steps 512 and 514 with an automatic switching step to avoid the requirement for manual manipulation by the user.

Meanwhile, during the reception of multimedia data via the Bluetooth™ access point 104, the controller 200 checks, at steps 518 and 520, whether or not hand-over is required, or whether or not the multimedia service is complete. When the multimedia service is complete (i.e. the multimedia data is completely transferred via the Bluetooth™ access point 104), the controller 200 executes step 530. On the other hand, when hand-over is required as the portable terminal 100 moves away from the currently-registered Bluetooth™ network 108, steps 522 and 524 are executed to search for a new Bluetooth™ network capable of providing multimedia services, as in the procedure at step 508. When a new Bluetooth™ network 108 capable of providing multimedia services is found, a hand-over to the found new Bluetooth™ network 108 is processed at step 526. Following step 526, the procedure returns to step 516 in order to continuously execute the processing of multimedia services through the Bluetooth™ access point 104 associated with the new Bluetooth m network 108. Thus, transfer of multimedia data is continued even when the portable terminal 100 moves to the service area of an adjacent Bluetooth™ network 108 while receiving the multimedia data.

Where it is determined at steps 522 and 524 that there is no new Bluetooth™ network capable of providing multimedia services, the procedure proceeds to step 528. At step 528, the controller 200 can optionally display, on the display unit 210, a message indicative of the fact that it is impossible to provide multimedia services through any Bluetooth™ access point, thereby informing the user of that fact. Subsequently, the controller 200 subsequently inactivates the Bluetooth™ module 102 at step 530, and then executes steps 532 and 534. At steps 532 and 534, the controller 200 can optionally inquire of the user whether or not he wants to access the multimedia services through the mobile communication network 110, by displaying a message indicative of that inquiry on the display unit 210. When the user does not want the multimedia service access through the mobile communication network 110, the controller 200 is switched to a standby mode at step 536. On the other hand, when the user selects the multimedia service access through the mobile communication network 110, the controller 200 executes the procedure of step 502, thereby performing the processing of multimedia services through the mobile communication network 110.

Now, sequential processing operations performed by the controller 300 of the Bluetooth™ access point 104 will be described with reference to FIG. 6 showing steps 600 to 620. In a standby mode at step 600, the controller 300 periodically checks whether or not a predetermined network checking period has elapsed, whether or not a request for SDP is made by the portable terminal 100 or other Bluetooth™ terminal, and whether or not a request for the file transfer profile is made.

When it is determined at step 602 that the predetermined network checking period has elapsed, the controller 300 checks at step 608 whether or not there is an unregistered new client in the associated Bluetooth™ network 108. If there is no unregistered new client, the controller 300 then returns to the standby mode of step 600. If there is an unregistered new client, the controller 300 performs processing of registration, and then returns to the standby mode of step 600.

For reference, registration of the portable terminal 100 to the Bluetooth™ network 108 will be described in conjunction with a typical Bluetooth™ registration. When the portable terminal 100 enters the service area of the Bluetooth™ network 108, it periodically receives an inquiry message from a master of the Bluetooth™ network 108, that is, the Bluetooth™ access point 104 of the Bluetooth™ network 108. In response to the inquiry message, the portable terminal 100 sends information that typically includes its ID (identity), system clock, service class, etc. The master of the piconet, that is, the Bluetooth m network 108, maintains the unit IDs in the piconet for about 5 hours. After this period elapses, the portable terminal 100 should again access the piconet, using the above mentioned inquiry message. The portable terminal 100 can be synchronized with the Bluetooth™ network 108 based on a page scan periodically sent from the master of the Bluetooth™ network 108 under the condition in which the master recognizes the portable terminal 100. Establishment of a desired channel is preferably achieved in accordance with L2CAP (Logic Link Control Adaptation Protocol) and multimedia services are preferably provided on L2CAP.

When it is determined at step 602 that the predetermined network checking period has not elapsed, the procedure proceeds to step 604. When it is determined at step 604 that a request for SDP is made in the procedure of steps 508 and 510 (FIG. 5), the controller 300 responds to the SDP request at step 612 by sending a service list, and then returns to the standby mode of step 600. On the other hand, when it is determined at step 604 that no SDP request is made, the procedure proceeds to step 606. When it is determined at step 606 that a request for the file transfer profile is made in the procedure of step 516 (FIG. 5), the controller performs, at step 614, a file transfer profile operation for sending, to the portable terminal 100, multimedia data following the multimedia data already sent to the portable terminal 100 via the mobile communication network 110. Where the requested multimedia data is stored in the storage unit 302, it is directly sent to the portable terminal 100. However, where the requested multimedia data is not stored in the storage unit 302, the controller 300 receives the requested multimedia data from the main server 120, and sends the received multimedia data to the portable terminal 100. The controller 300 also stores the received multimedia data in the storage unit 302, so as to simply send, in response to a subsequent request for the multimedia data from the portable terminal 100, the stored multimedia data to the portable terminal 100 without receiving again the multimedia data from the main server 120. Following step 614, step 616 is executed. On the other hand, where it is determined at step 606 that no file transfer profile request is made, the controller 300 returns to the standby mode of step 600.

At steps 616 and 618, the controller 300 checks whether or not hand-over is required as the portable terminal 100 moves away from the currently registered Bluetooth™ network 108, and whether or not the multimedia services are completed, as in the above described procedure of steps 518 and 520 (FIG. 5). Under the condition in which the multimedia services are completed in accordance with complete transfer of desired multimedia data to the portable terminal 100, the controller 300 returns to the standby mode of step 600. On the other hand, when hand-over is required as the portable terminal 100 is detected to be moving to an adjacent Bluetooth™ network that is part of a scatternet that includes the Bluetooth™ network 108 in which the portable terminal 100 is currently registered, the controller 300 performs, at step 620, a hand-over to the new Bluetooth™ network, in accordance with the above described procedure of steps 522 to 526 (FIG. 5), and subsequently returns to the standby mode of step 600.

Figure 7:
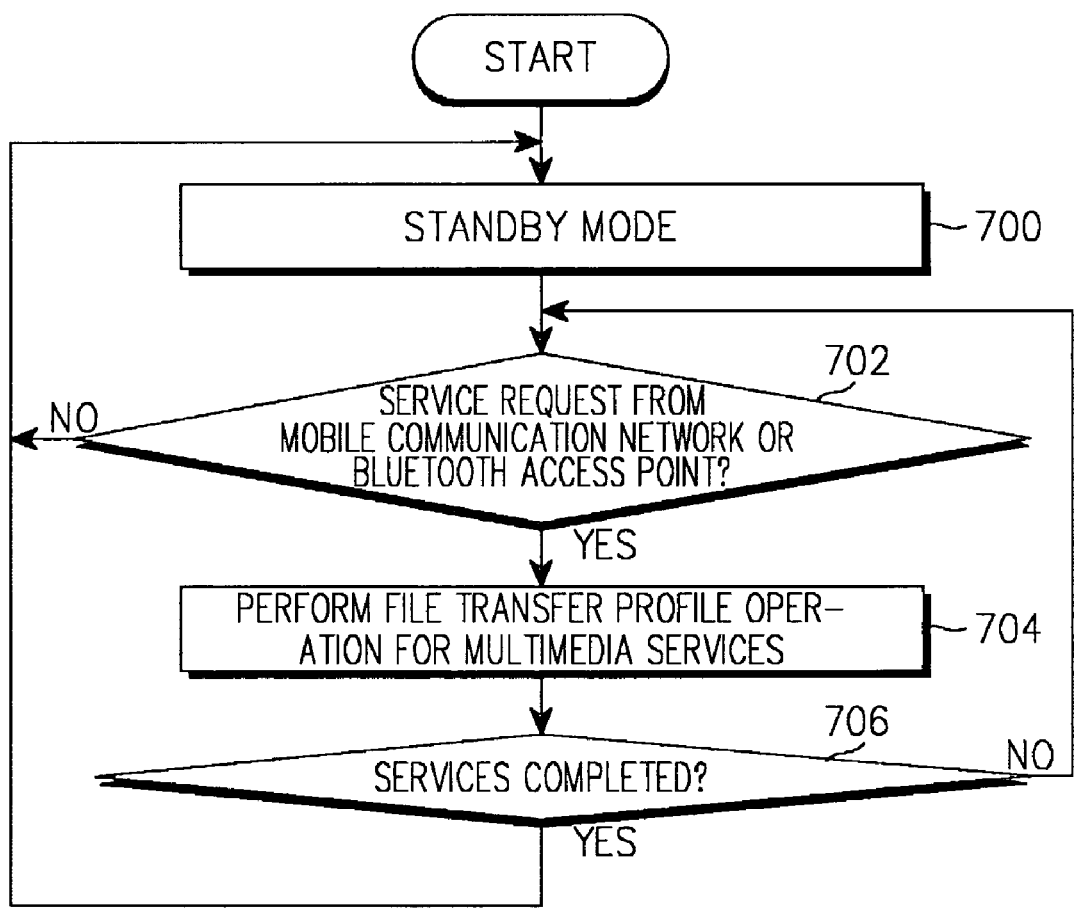
FIG. 7 is a flow chart illustrating sequential processing operations performed by the main server in accordance with an embodiment of the present invention.

Sequential processing operations performed by the controller 400 of the main server 120 will now be described with reference to FIG. 7 showing steps 700 to 706. The controller 400 of the main server 120 proceeds from a standby mode at step 700 to step 702 when it receives a service request sent from the portable terminal 100 via the mobile communication network 110 in accordance with the above described procedure of step 502 (FIG. 5), or a service request sent from a Bluetooth™ access point 104 associated with the portable terminal 100 in accordance with the above described procedure of step 614 (FIG. 6). At step 704, the controller 400 performs a file transfer profile operation for multimedia services in response to the received service request, and sends desired multimedia data (typically from the storage unit 402) to the portable terminal 100 via the mobile communication network 110 or Bluetooth™ access point 104. When the controller 400 receives a service request from a Bluetooth™ access point 104 during the transfer of multimedia data to the portable terminal 100 via the Internet to the mobile communication network 110, it stops the transfer of multimedia data performed via the mobile communication network 110, and subsequently sends, via the Internet and to the Bluetooth™ access point 104, multimedia data following the transferred multimedia data. When it is determined at step 706 that the multimedia services are completed, the controller 400 returns to the standby mode of step 700. On the other hand, when it is determined at step 706 that the multimedia services are still continued, the controller 400 returns to step 702.

Accordingly, when the data transfer rate is reduced to a reference value or less during reception of multimedia data via the mobile communication network 110, it is possible to receive the multimedia data via the Bluetooth™ access point 104 in place of the mobile communication network 110. Thus, multimedia services of a good quality can be continuously provided through the Bluetooth™ access point 104 even when the data transfer rate through the mobile communication network 110 is determined to be impermissibly reduced, which often occurs at particular areas such as a public area due to an increase in the rate of using multimedia services.

While this invention has been described in connection with what is presently considered to be the most practical and preferred embodiment, it is to be understood by those skilled in the art that the invention is not limited to the disclosed embodiment, but, on the contrary, it is intended to cover various modifications within the spirit and scope of the appended claims. For example, although the embodiment of the present invention has been described as involving additional processing such as multimedia service access through the mobile communication network after processing a hand-over or completing transfer of multimedia data through the Bluetooth™ access point, such additional processing may be omitted.

What is claimed is:

1. A system for providing multimedia services to a portable terminal via a mobile communication network, comprising:
   a main server for providing multimedia services via an Internet connection;
   a plurality of Bluetooth™ access points connected to the main server via the Internet, each Bluetooth™ access point including a Bluetooth™ module having a file transfer profile and operating as a master of a Bluetooth™ network;
   a portable terminal including its own Bluetooth™ module having the file transfer profile, the portable terminal having wireless access to the Internet via the mobile communication network; wherein
   the main server transferring multimedia data to the portable terminal via the mobile communication network or via one of the plurality of Bluetooth™ access points in response to a service request received from the mobile communication network or the Bluetooth access point.

2. The system according to claim 1, wherein one of the plurality of Bluetooth™ access points sending the service request to the main server in response to a service request received from the portable terminal, receiving the multimedia data from the main server, and transferring the received multimedia data to the portable terminal.

3. The system according to claim 1, wherein the portable terminal sending the service request to the main server in accordance with the wireless access to the Internet via the mobile communication network or via one of the plurality of Bluetooth™ access points when a transfer rate of the multimedia data transferred via the mobile communication network is determined to be at or below a predetermined reference value, thereby continuously receiving the multimedia data via the Bluetooth™ access point.

4. The system according to claim 1, wherein the portable terminal is registered to one of the plurality of Bluetooth™ access points, which is included in the Bluetooth™ network having a service area where the portable terminal is located, so as to allow the portable terminal to request the Bluetooth™ access point to send the multimedia data.

5. The system according to claim 1, wherein the Bluetooth™ network associated with one of the plurality of Bluetooth™ access points and the portable terminal perform a hand-over to an adjacent Bluetooth™ network when the portable terminal moves to a service area of the adjacent Bluetooth™ network during the transfer of the multimedia data between the portable terminal and the Bluetooth™ access point, whereby the multimedia data is continuously transferred.

6. A method for providing multimedia services to a portable terminal in a system including a main server for providing the multimedia services via an Internet connection; wherein a plurality of Bluetooth™ access points are connected to the main server via the same or another Internet connection, each Bluetooth™ access point including a Bluetooth™ module having a file transfer profile, and the portable terminal including its own Bluetooth™ module having the file transfer profile, the portable terminal having wireless access to the Internet via a mobile communication network; the method comprising the steps of:
   requesting, by the portable terminal, the providing of multimedia data services in accordance with the wireless access to the Internet via the mobile communication network;
   transferring the multimedia data to the portable terminal via the mobile communication network in response to the service request;
   receiving the multimedia data by the portable terminal, via the mobile communication network, and checking a transfer rate of the multimedia data;
   requesting, by the portable terminal, a selected Bluetooth™ access point to provide the multimedia services when the data transfer rate is determined to be at or below a predetermined reference value;
   requesting, by the selected Bluetooth™ access point, the providing of the multimedia services in response to the service request received from the selected Bluetooth™ access point, receiving the multimedia data by the selected Bluetooth™ access point, and transferring the multimedia data to the portable terminal by the selected Bluetooth™ access point.

7. The method according to claim 6, further comprising: controlling a Bluetooth™ network associated with the selected Bluetooth™ access point to perform a hand-over to an adjacent Bluetooth™ network when the portable terminal moves to a service area of the adjacent Bluetooth™ network during the transfer of the multimedia data, to allow continuous transfer of the multimedia data.

8. The method according to claim 6, further comprising: controlling the portable terminal to switch from the mobile communication network to the Bluetooth™ network associated with the selected Bluetooth™ access point, when it is detected that the data transfer rate is at or below the reference value, by inquiring of a user of the portable terminal whether or not the multimedia data is to be continuously received.

9. The method according to claim 6, further comprising: registering the portable terminal to the selected Bluetooth™ access point when a user selects to switch the portable terminal, and
requesting by the portable terminal, the selected Bluetooth™ access point to provide the multimedia services.

10. A method for providing multimedia services from an Internet connection to a portable terminal in a system including a main server for providing the multimedia services via the Internet, a plurality of Bluetooth™ access points connected to the main server via the Internet, each Bluetooth™ access point including a Bluetooth™ module having a file transfer profile and operating as a master of a Bluetooth™ network in a defined service area, and the portable terminal also including the Bluetooth™ module having the file transfer profile with the portable terminal having wireless access to the Internet via a mobile communication network; the method comprising the steps of:
requesting the main server to provide multimedia services in accordance with the wireless access to the Internet via the mobile communication network;
receiving multimedia data transferred from the main server via the mobile communication network in response to the service request;
checking a transfer rate of the multimedia data during the transfer of the multimedia data;
requesting a selected Bluetooth™ access point to provide the multimedia services when the data transfer rate is determined to be at or below a reference value;
stopping the reception of the multimedia data via the mobile communication network; and
receiving the multimedia data from the selected Bluetooth™ access point in response to a service request from the portable terminal.

11. The method according to claim 10, further comprising:
inquiring of a user of the portable terminal whether or not the multimedia data is to be received via the selected Bluetooth™ access point.

12. The method according to claim 10, further comprising:
registering the portable terminal to the selected Bluetooth™ access point when the user selects switching of the portable terminal to the Bluetooth™ network, and requesting the selected Bluetooth™ access point to provide the multimedia services.

13. A method for providing multimedia services to a portable terminal in a system including a main server for providing the multimedia services via the Internet; a plurality of Bluetooth™ access points connected to the main server via an Internet connection, each of the Bluetooth™ access points including a Bluetooth™ module having a file transfer profile, and operating as a master of a Bluetooth™ network having a defined service area; and the portable terminal including its own Bluetooth™ module having the file transfer profile, the portable terminal having wireless access to the Internet via a mobile communication network; the method comprising the steps of:
transferring multimedia data to the portable terminal via the mobile communication network;
stopping the transfer of the multimedia data via the mobile communication network in response to a request from the portable terminal; and
transferring to the portable terminal the multimedia data via the Bluetooth™ access point.

14. A method for providing multimedia services to a portable terminal in a system including a main server for providing the multimedia services via an Internet connection; a plurality of Bluetooth™ access points connected to the main server via the Internet, with each Bluetooth™ access point including a Bluetooth™ module having a file transfer profile and operating as a master of a Bluetooth™ network having a defined service area; and the portable terminal including one of said Bluetooth™ modules having the file transfer profile and having wireless access to the Internet via a mobile communication network; the method comprising the steps of:
requesting the main server to provide multimedia services in response to a service request from the portable terminal; and
transferring, to the portable terminal, multimedia data received from the main server in response to the service request.

15. The method according to claim 14, further comprising the step of:
controlling the portable terminal to perform a hand-over to a Bluetooth™ network adjacent to the Bluetooth™ network having a service area where the portable terminal is located, when the portable terminal moves to a service area of the adjacent Bluetooth™ network during the transfer of the multimedia data, thereby continuously transferring the multimedia data.

16. A method for providing multimedia services to a portable terminal in a system including a main server for providing the multimedia services via the Internet, a plurality of Bluetooth™ access points connected to the main server via the Internet, with each Bluetooth™ access point including a Bluetooth™ module having a file transfer profile and operating as a master of a Bluetooth™ network having a defined service area, and the portable terminal including a Bluetooth™ module having the file transfer profile and having wireless access to the Internet via a mobile communication network; the method comprising the steps of:
receiving a service request for multimedia data from the portable terminal;
checking whether the requested multimedia data is stored in a storage unit;
transferring the stored multimedia data to the portable terminal if it is determined that the requested multimedia data is stored in the storage unit;
requesting the main server provide the requested multimedia data if it is determined that the requested multimedia data is not stored in the storage unit; and
transferring multimedia data received from the main server in response to the request while storing the received multimedia data in the storage unit.

* * * * *